US012576799B2

(12) United States Patent
Quesnel

(10) Patent No.: US 12,576,799 B2
(45) Date of Patent: Mar. 17, 2026

(54) METHOD OF MANUFACTURING A VEHICLE TRIM ELEMENT AND ASSOCIATED TRIM ELEMENT

(71) Applicant: FAURECIA INTERIEUR INDUSTRIE, Nanterre (FR)

(72) Inventor: Benjamin Quesnel, Valencia (ES)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 404 days.

(21) Appl. No.: 18/189,137

(22) Filed: Mar. 23, 2023

(65) Prior Publication Data

US 2023/0303011 A1 Sep. 28, 2023

(30) Foreign Application Priority Data

Mar. 24, 2022 (FR) ...................................... 22 02615

(51) Int. Cl.
*B60R 13/02* (2006.01)
*B29C 43/20* (2006.01)
*B29L 31/30* (2006.01)
(52) U.S. Cl.
CPC ............ *B60R 13/02* (2013.01); *B29C 43/203* (2013.01); *B29L 2031/3041* (2013.01)
(58) Field of Classification Search
CPC ................... B60R 13/02; B29C 43/203; B29L 2031/3041
See application file for complete search history.

(56) References Cited

U.S. PATENT DOCUMENTS

| | | | | |
|---|---|---|---|---|
| 8,002,330 | B2 * | 8/2011 | Arnold .................... | B60R 13/02 428/56 |
| 8,530,028 | B2 * | 9/2013 | Smith .................... | B60R 13/02 428/102 |
| 2009/0085237 | A1 * | 4/2009 | Wolgamott ....... | B29C 45/14262 264/40.5 |
| 2014/0183892 | A1 | 7/2014 | Beau et al. | |
| 2014/0284953 | A1 | 9/2014 | Paruchuri | |
| 2015/0314737 | A1 | 11/2015 | Zimmer et al. | |
| 2019/0389097 | A1 * | 12/2019 | Heikkila ................ | B29C 43/56 |
| 2021/0101350 | A1 | 4/2021 | Aitharaju et al. | |
| 2021/0370556 | A1 * | 12/2021 | Klusmeier ........... | B60H 1/2227 |

OTHER PUBLICATIONS

French Search Report corresponding to application FR 2202615, dated Nov. 4, 2022, 2 pages.

* cited by examiner

*Primary Examiner* — Faye M Fleming
(74) *Attorney, Agent, or Firm* — Reising Ethington P.C.

(57) ABSTRACT

A vehicle trim element and method for manufacturing the trim element. The method includes the steps of: supplying a substrate comprising natural fibers and thermoplastic fibers entangled together, supplying a first layer comprising a base layer and provided with at least one reinforcing and/or decorative element, and compressing the first layer against the substrate. The method also includes, prior to compression, aligning the first layer and the substrate by aligning a first positioning element of the substrate and a second positioning element of the first layer arranged outside the at least one reinforcing and/or decorative element.

12 Claims, 2 Drawing Sheets

METHOD OF MANUFACTURING A VEHICLE TRIM ELEMENT AND ASSOCIATED TRIM ELEMENT

TECHNICAL FIELD

The present invention relates to a method for manufacturing a vehicle trim element, comprising the following steps:

supply of a substrate, the substrate comprising natural fibers and thermoplastic fibers, preferentially polypropylene or polylactic acid, the natural fibers and thermoplastic fibers being entangled together, supply of a first layer, the first layer comprising a base layer of woven fabric or non-woven fabric, the first layer being provided with at least one reinforcing and/or decorative element, and compression of the first layer against the substrate so as to rigidly attach the first layer to the substrate and form the trim element.

BACKGROUND

Document U.S. Pat. No. 2014/0284953 A1 describes a trim element for the passenger compartment of a vehicle comprising a substrate made of a material having at least one natural substance, a decorative layer made of a material having natural fibers at least partially covering a visible face of the substrate, and a transparent or translucent outer layer being provided at least partially on the substrate and/or the decorative layer.

The different layers are placed on top of each other and then heat-pressed together to give a two- or three-dimensional element.

However, it is not specified how the layers are placed on top of each other, in particular as to the positioning of the layers between each other. There is thereby a risk that the decorative layer is incorrectly positioned over the substrate, so that the trim element is not satisfactory.

The document U.S. Pat. No. 2015/0314737 A1 describes the use of a frame wherein a fabric is positioned in order to position the fabric correctly in a mold.

However, it is not described how the fabric is positioned in the mold.

Moreover, the above requires such a frame.

SUMMARY

An object of the invention is to provide a method for manufacturing a trim element with a first layer having at least one reinforcing and/or decorative element and a substrate pressed together, wherein the positioning of the reinforcing and/or decorative element is as desired.

To this end, the invention relates to a method of the aforementioned type, wherein the substrate has at least one first positioning element, the first layer having at least one second positioning element, the at least one second positioning element being arranged outside the at least one reinforcing and/or decorative element, the method comprising a step of aligning the first layer and the substrate by aligning the at least one first positioning element and the at least one second positioning element prior to the compression step.

The presence of the positioning elements makes it possible to correctly position the first layer, and thereby the at least one reinforcing and/or decorative element, on the substrate. Moreover, such positioning is particularly easy to implement.

The manufacturing method can further have one or a plurality of the following features, considered individually or in all technically possible combinations:

the at least one first positioning element and the at least one second positioning element are through-holes defined in the substrate and the first layer, respectively;

the first layer has substantially the size of a first surface of the substrate;

the first layer has a size strictly smaller than the size of a first face of the substrate, the first layer extending only over a first portion of the first face of the substrate after the compression step;

said first portion of the first surface of the substrate comprises at least one edge of the substrate, the at least one first positioning element being arranged near said edge of the substrate;

the first layer is pressed against a first face of the substrate during the compression step, the method comprising the step of providing a second layer comprising a layer of woven fabric or non-woven fabric, the second layer being provided with at least one additional reinforcing and/or decorative element, the second layer having at least one third positioning element, the at least one third positioning element being arranged outside the at least one additional reinforcing and/or decorative element, the second layer being aligned with the first layer and the substrate during the alignment step by aligning the at least one third positioning element with the at least one first positioning element and the at least one second positioning element, the second layer being pressed against a second face of the substrate during the compression step, the second face being opposite the first face;

the at least one reinforcing and/or decorative element of the first layer is a woven or non-woven uni- or multi-directional reinforcing layer;

the at least one reinforcing and/or decorative element of the first layer comprises a matrix and natural fibers, the matrix comprising between 10% and 60% polyurethane or epoxy resin; and/or the base layer of the first layer comprises at least 20% polypropylene, at least 20% polyamide, at least 20% polyester, or at least 20% polylactic acid or is provided with a gripping layer.

The invention further relates to a vehicle trim element obtained by the manufacturing method of the aforementioned type.

BRIEF DESCRIPTION OF THE DRAWINGS

Other features and advantages of the invention will appear upon reading the following description which follows embodiments of the invention, given only as a limiting example, and making reference to the following drawings, wherein.

DETAILED DESCRIPTION

Figure 1:
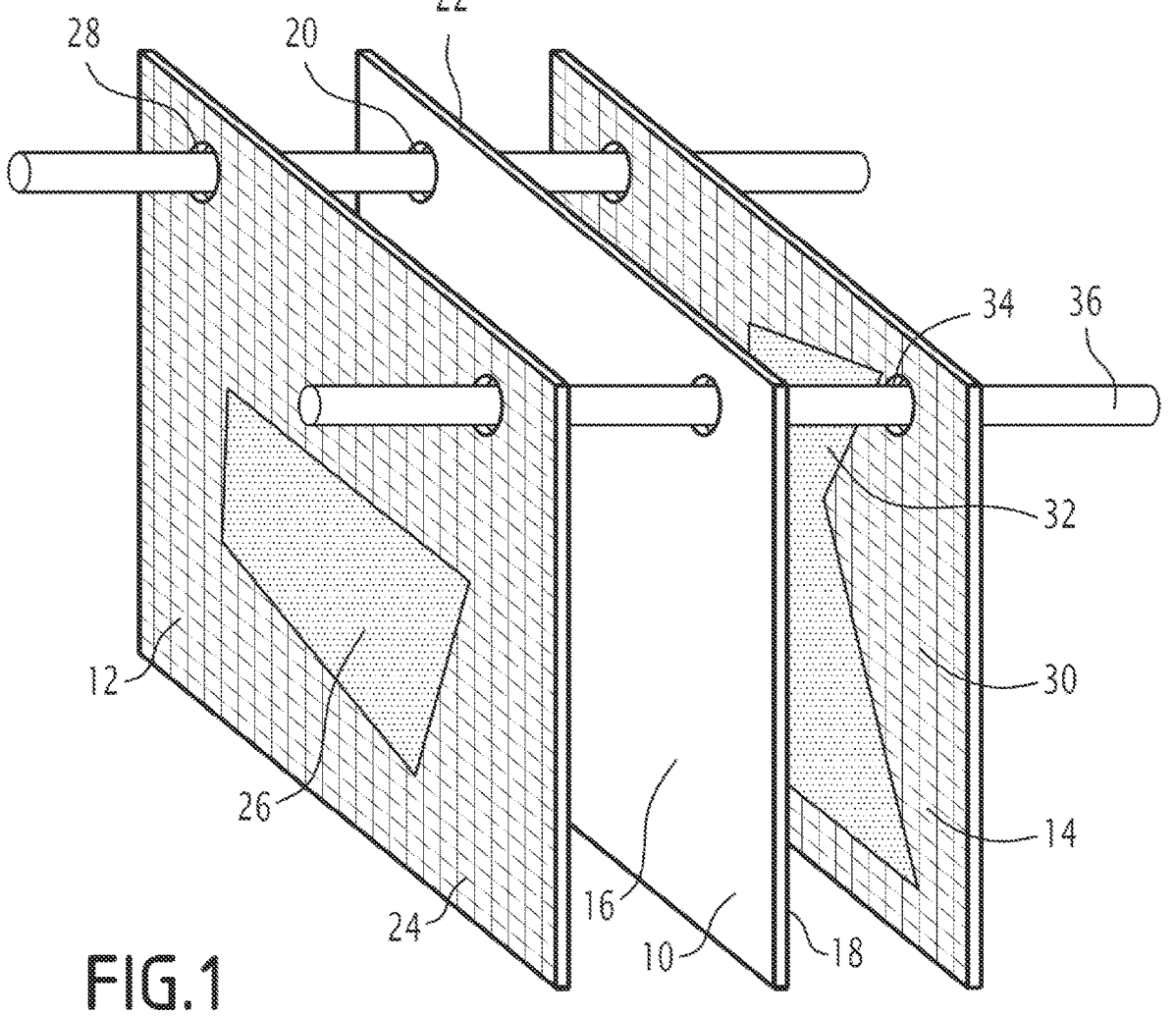
FIG. 1 is a schematic view of the principle of an example of manufacturing method of a trim element according to one embodiment of the invention.

A schematic representation of the principle of an example of a method for manufacturing a vehicle trim element is shown in FIG. 1.

The method comprises the following steps:

supply of a substrate 10, supply of a first layer 12, alignment of the first layer 12 and of the substrate 10, and compression of the first layer 12 against the substrate 10.

In a particular embodiment, the method further comprises the additional step of supplying a second layer 14.

The substrate 10 has a first face 16, herein intended for being oriented towards the interior of a passenger compartment of a vehicle, and a second face 18, opposite the first face 16.

The substrate 10 comprises natural fibers, more particularly long natural fibers, and thermoplastic fibers, in particular polypropylene or polylactic acid fibers.

Natural fibers and thermoplastic fibers are entangled together.

The substrate 10 is e.g. formed by at least one step of needling the assembly formed by the natural fibers and the thermoplastic fibers.

Long natural fibers refer to natural fibers having a length comprised between 10 and 90 millimeters.

Natural fibers are e.g. wood, kenaf, hemp or flax fibers.

Natural fibers have a linear density comprised between 6 dtex and 7 dtex, 1 tex being the mass in grams of one of the fibers.

The substrate comprises between 200 and 1500 grams of natural fibers per square meter of surface area.

The substrate 10 is a non-woven substrate.

The substrate 10 has at least one first positioning element 20, herein a plurality, more particularly two first positioning elements.

The first positioning elements 20 are e.g. holes crossing through the substrate and defined in the substrate 10.

The or each first positioning element 20 is e.g. arranged close to an edge 22 of the substrate 10, more particularly at a distance of less than 100 mm from said edge 22 of the substrate 10.

In the example shown, the substrate 10 has at least one positioning element 20 near each end of said edge 22 of the substrate, more particularly at a distance of less than 100 mm from said end.

The first layer 12 herein comprises a base layer 24, made of woven fabric or non-woven fabric, and is provided with at least one reinforcing and/or decorative element 26.

The first layer 12 has a thickness of less than 5 mm.

The at least one reinforcing and/or decorative element 26 is arranged on the base layer 24.

The at least one reinforcing and/or decorative element 26 is arranged herein indifferently on one side or the other of the first layer 12.

In one embodiment, the at least one reinforcing and/or decorative element 26 is arranged on the face of the first layer 12 intended for extending away from the substrate 10.

Alternatively, the at least one reinforcing and/or decorative element 26 is arranged on the face of the first layer 12 intended for extending against the substrate 10.

The element 26 is e.g. fastened to the base layer 24, by heat-bonding or by stamping, with e.g. a flat positioning by a robot before a calendaring step.

The base layer 24 is such that same is apt to rigidly attach the at least one reinforcing and/or decorative element 26 to the substrate 10 by compression, more particularly thermo-compression, as described hereinafter.

The base layer 24 is e.g. a non-woven fabric.

The base layer 24 comprises e.g. at least 20% polypropylene, at least 20% polyamide, at least 20% polyester, or at least 20% polylactic acid.

The base layer 24 further comprises at least 30% of bio-based content i.e. wholly or partly made from materials of biological origin.

The base layer 24 has an area density comprised between 80 and 100 grams per square meter.

The at least one reinforcing and/or decorative element 26 extends only over a portion of the base layer 24.

The at least one reinforcing and/or decorative element 26 is an either woven or non-woven uni- or multi-directional reinforcing layer.

The at least one reinforcing and/or decorative element 26 consists of at least 80% by mass of natural material(s).

The at least one reinforcing and/or decorative element 26 has an area density comprised between 50 and 300 grams per square meter.

The at least one reinforcing and/or decorative element 26 is e.g. a composite element comprising e.g. a matrix filled with natural fibers.

The matrix comprises e.g. between 10% and 60% polyurethane or epoxy resin. The epoxy resin comprises, e.g., a portion of bio-based resin.

The at least one reinforcing and/or decorative element 26 comprises between 40 and 200 grams of natural fibers per square meter of surface area.

The natural fibers are e.g. oriented in at least one reinforcing direction, e.g. in a single reinforcing direction.

The first layer 12 has at least one second positioning element 28, herein a plurality, more particularly two second positioning elements.

The at least one second positioning element 28 is arranged outside the at least one reinforcement and/or decoration element 26.

The second positioning elements 28 are holes crossing through the first layer 12 and defined in the first layer 12, more particularly crossing through the base layer 24 and defined in the base layer 24, more particularly crossing through a portion of the base layer 24 without a reinforcing and/or decorative element, called the bare portion of the base layer 24, and defined in said bare portion of the base layer 24.

The first layer 12 has the same number of second positioning elements 28 as the substrate 10 has first positioning elements 20.

The second positioning elements 28 are placed relative to one another in a similar way to the relative locations of the first positioning elements 20 between each other.

Thereby, there is a relative position of the first layer 12 with respect to the substrate 10, wherein the first positioning elements 20 and the second positioning elements 28 are aligned.

In the example shown, the first layer 12 has substantially the shape and the size of the first face 16 of the substrate.

The second positioning elements 28 are arranged on the first layer 12 in a similar way to the first positioning elements 20 on the substrate 10, i.e. when the first layer 12 and the substrate 10 are overlaid with the respective edges thereof aligned, the first positioning elements 20 and the second positioning elements being aligned.

The second layer 14 is e.g. similar to the first layer 12.

The second layer 14 herein comprises a base layer 30 made of woven fabric or of non-woven fabric and is provided with at least one additional reinforcing and/or decorative element 32.

The second layer 14 has a thickness of less than 5 mm.

The at least one additional reinforcing and/or decorative element 32 is arranged on the base layer 30.

The at least one additional reinforcement and/or decoration element 32 is arranged herein indifferently on one side or the other of the second layer 14.

The base layer 30 is such that same is apt to rigidly attach the at least one reinforcing and/or decorative element 32 to the substrate 10 by compression, more particularly thermocompression, as described hereinafter.

In one embodiment, the at least one additional reinforcement and/or decoration element 32 is arranged on the face of the second layer 14 intended for extending against the substrate 10.

Alternatively, the at least one additional reinforcing and/or decorative element 32 is arranged on the face opposite said face.

The base layer 30 of the second layer 14 is e.g. identical to the base layer 24 of the first layer 12.

The at least one additional reinforcing and/or decorative element 32 extends only over a portion of the base layer 30.

The at least one additional reinforcement and/or decoration element 32 is e.g. as described hereinabove with regard to the at least one reinforcement and/or decoration element 26.

Alternatively, the at least one additional reinforcement and/or decoration element 32 is different from the at least one reinforcement and/or decoration element 26. The additional reinforcing and/or decorative element 32 e.g. comprises, more particularly consists of, between 40% and 60% of polypropylene and between 40% and 60% of long natural fibers. The at least one additional reinforcing and/or decorative element 32 then has e.g. an area density comprised between 250 and 350 grams per square meter.

The second layer 14 has at least one third positioning element 34, herein a plurality, more particularly two third positioning elements.

The at least one third positioning element 34 is arranged outside the at least one additional reinforcement and/or decoration element 32.

The third positioning elements 34 are holes crossing through the second layer 14 and defined in the second layer 14, more particularly crossing through the base layer 30 and defined in the base layer 30, more particularly crossing through a portion of the base layer 30 without a reinforcing and/or decorative element, called the bare portion of the base layer 30, and defined in said bare portion of the base layer 30.

The second layer 14 has the same number of third positioning elements 34 as the substrate 10 has first positioning elements 20.

The third positioning elements 34 are placed relative to one another in a similar way as the relative locations of the first positioning elements 20 between each other.

Thereby, there is a relative position of the second layer 14 with respect to the substrate 10, wherein the second elements 20 and the third positioning elements 34 are aligned.

In the example shown, the second layer 14 has substantially the shape and the size of the second face 18 of the substrate.

The third positioning elements 34 are arranged on the second layer 14 in a similar way to the first positioning elements 20 on the substrate 10, i.e. when the second layer 14 and the substrate 10 are overlaid with the respective edges thereof aligned, the first positioning elements 20 and the third positioning elements 34 are aligned.

After the respective supply steps, the first layer 12 and the substrate 10, and where appropriate the second layer 14, are aligned by aligning the at least one first positioning element

20 and the at least one second positioning element 28, and, where appropriate, the at least one third positioning element 34.

The first layer 12 extends opposite the first face 16 of the substrate 10.

Where appropriate, the second layer 14 extends opposite the second face 18 of the substrate 10.

Each of the substrate 10 and of the first layer 12, and where appropriate the second layer 14, are e.g. placed on the same structure having supplementary positioning elements 36.

More particularly, the structure comprises as many supplementary positioning elements as the substrate 10 comprises first positioning elements 20.

The supplementary positioning elements 36 are e.g. straight masts, herein horizontal.

The first layer 12 and the substrate 10, and where appropriate the second layer 14, are inserted on the structure one after the other, so that a respective mast is inserted in each through hole forming a positioning element.

The first layer 12 extends directly against the substrate 10 and, where appropriate, the second layer 14 also extends directly against the substrate 10 opposite the first layer 12.

Each of the first layer 12, of the substrate 10, and, where appropriate, of the second layer 14 herein extends vertically on the structure.

The positioning elements of the first layer 12, of the substrate 10 and, where appropriate, of the second layer 14 are aligned along the supplementary positioning elements 36, herein along the masts.

Thus, the first layer 12 and the substrate 10, and where appropriate the second layer 14, are aligned so that the reinforcement and/or decoration elements 26, 32 are correctly positioned.

The structure then conveys e.g. the assembly to a compression mold.

The first layer 12, and where appropriate the second layer 14, is (are) then pressed against the substrate so as to rigidly attach the first layer 12, and where appropriate the second layer 14, to the substrate 10 and form the trim element The first layer 12 is pressed against the first face 16 of the substrate 10 during the compression step.

Where appropriate, the second layer 14 is pressed against the second face 18 of the substrate 10 during the compression step.

The compression step is e.g., carried out by thermoforming by compression, in the compression mold.

The compression step is carried out at a temperature comprised between 150° C. and 250° C.

The base layer 24 of the first layer 12, and where appropriate the base layer 30 of the second layer 14, provide the unity of the reinforcing and/or decorative elements 26, 32 with the substrate 10.

The fibers between the substrate 10 and the base layer 24, and where appropriate the base layer 30, herein form chemical bonds during thermocompression, to provide fastening.

Additionally, the element obtained after the compression step is cut into the desired shape.

Additionally, a film (not shown) is e.g. thermoformed with the first layer 12 during the compression step. More particularly, the film is arranged on the surface of the first layer 12 opposite the substrate 10 before the compression step. The film comprises e.g., more particularly consists of, polypropylene or polycarbonate or polyurethane and one or a plurality of bio-based materials.

The film has e.g. similarly, positioning elements, so as to be correctly placed on the first layer 12.

In an alternative embodiment (not shown), the first layer 12 has a size strictly smaller than the size of the first face 16 of the substrate 10, the first layer 12 extending only over a first portion of the first face 16 of the substrate 10 after the compression step.

Said first portion comprises the locations of the at least one first positioning element 20. Said first portion of the first face of the substrate 10 further comprises herein the edge 22 of the substrate 10.

Additionally or alternatively, the second layer 14 has a size strictly smaller than the size of the second face 18 of the substrate 10, the second layer 14 extending only over a second portion of the second face 18 of the substrate 10 after the compression step. Said second portion of the second face of the substrate 10 herein comprises the edge 22 of the substrate 10.

Said second portion comprises the locations of the at least one first positioning element 20. Said second portion of the first face of the substrate 10 further comprises herein the edge 22 of the substrate 10.

Thereby, in the method, the reinforcement and/or decoration elements 26, 32 are placed as desired within the trim element, the different layers and the substrate being aligned for a correct positioning.

In an alternative embodiment to the embodiment described above, the base layer 24 and/or the additional base layer 30 additionally has e.g. a gripping layer on the face intended for extending facing the substrate 10. The gripping layer is suitable for cooperating with the fibers of the substrate 10, i.e. for gripping the fibers of the substrate 10.

The gripping layer is herein the gripping layer of a hook-and-loop fastener, such as Velcro®.

Alternatively, the base layer 24 and/or the additional base layer 30 have no gripping layer, yet such a gripping layer is provided on the face of the substrate 10 suitable for extending opposite the base layer 24 and/or of the additional base layer 30.

Alternatively, one of the base layers 24 and/or the additional base layer 30 is provided with such a gripping layer on the face intended for extending opposite the substrate 10, the substrate having such a gripping layer facing the other base layer 24 and/or of the additional base layer 30.

In another alternative embodiment to the main embodiment described hereinabove, the base layer 24 and/or the additional base layer 30 additionally has e.g. glue on the face intended for extending against the substrate 10.

The invention further relates to a trim element obtained by the method described hereinabove.

Figure 2:
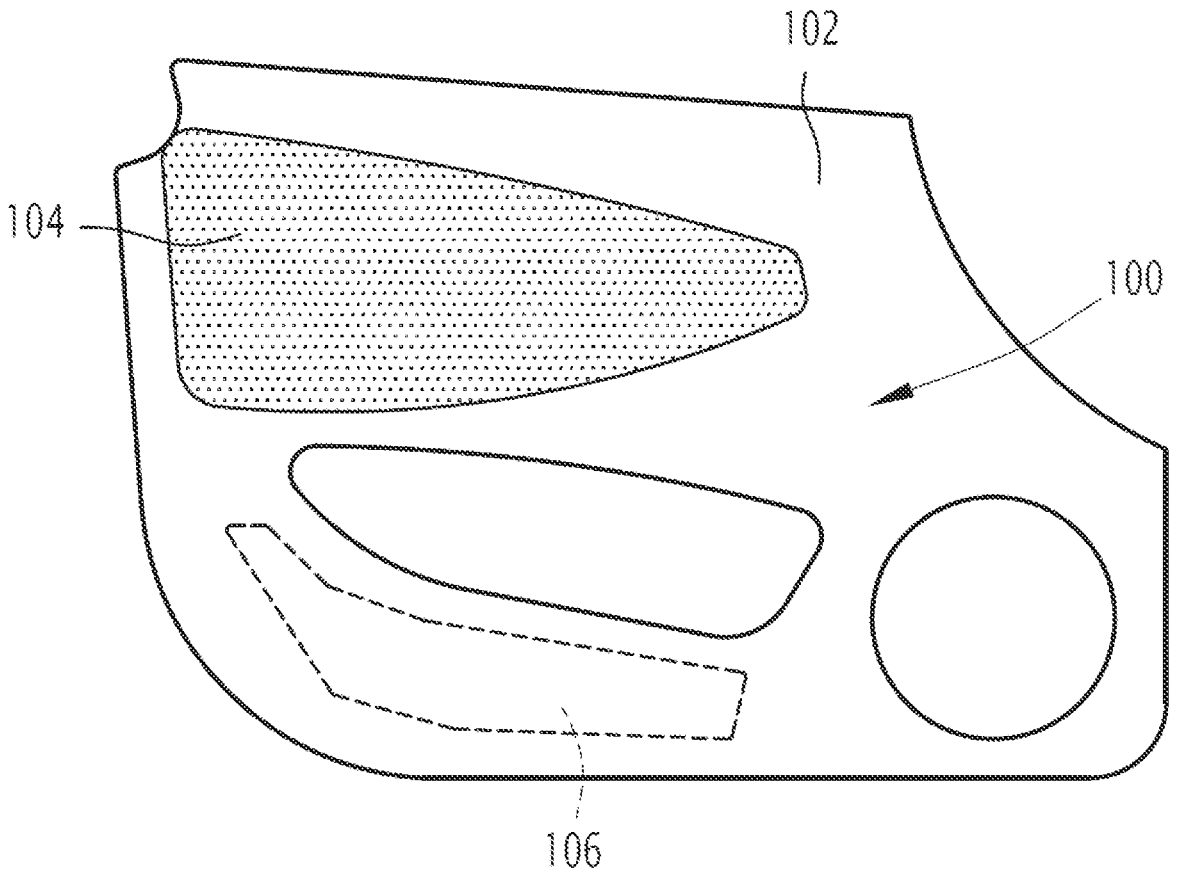
FIG. 2 is a perspective view of an example of trim element produced by a method according to an embodiment of the invention.

An example of such an element 100 is shown in FIG. 2.

The trim element 100 is e.g. a vehicle door panel.

The trim element 100 has a first face 102 intended for extending facing the passenger compartment of a vehicle and an opposite second face.

The trim element 100 comprises a central layer formed by the substrate, a first layer and, herein, a second layer, as described hereinabove.

The central layer, the first layer and the second layer are thermoformed by compression together into the trim element, as described hereinabove.

The trim element 100 herein comprises a decorative element 104 on the first face 102 and a reinforcing element 106 on the second face.

The decorative element 104 is part of the first layer.

The reinforcing element 106 is part of the second layer.

The decorative element 104 and the reinforcing element 106 are precisely positioned by means of the method described hereinabove.

Indeed, as described hereinabove, the first layer, the substrate and the second layer, where appropriate, have positioning elements, said positioning elements making a precise positioning of the decorative and/or reinforcement elements on the substrate possible by aligning the positioning elements with one another.

Herein, such a trim element advantageously has no glue, the base layer of the first layer and of the second layer providing the unity of the corresponding element 104, 106 with the substrate.

In one embodiment, the trim element has the positioning elements of the first layer, the substrate and the second layer, where appropriate, aligned.

Alternatively, the assembly formed by the first layer, the substrate and the second layer, where appropriate, is cut after the compression step, so that the locating elements are not comprised in the final trim element.

During manufacture, the presence of the positioning elements makes it possible to correctly position the first layer and, if appropriate, the second layer, and thus the at least one reinforcing and/or decorative element, on the substrate.

Moreover, such positioning is particularly easy to implement, by simple alignment of the positioning elements, in particular by simple insertion of each layer on masts, on which the positioning elements are thus automatically aligned.

The invention claimed is:

1. A method of manufacturing a vehicle trim element, comprising the following steps:

supplying a substrate comprising natural fibers and thermoplastic fibers, the natural fibers and the thermoplastic fibers being entangled together, supplying a first layer comprising a base layer made of woven fabric or non-woven fabric, the first layer being provided with at least one reinforcing and/or decorative element, and compressing the first layer against the substrate so as to rigidly attach the first layer to the substrate and form the trim element, wherein the substrate has at least one first positioning element, the first layer having at least one second positioning element, the at least one second positioning element being arranged outside the at least one reinforcing and/or decorative element, wherein the second positioning element is arranged on the first layer such that, when the first layer and the substrate are overlaid with respective edges thereof aligned, the first positioning element and the second positioning element are aligned, wherein the method further comprises aligning the first layer and the substrate by aligning the at least one first positioning element and the at least one second positioning element before the compression step.

2. The manufacturing method according to claim 1, wherein the at least one first positioning element and the at least one second positioning element are through-holes defined in the substrate and the first layer, respectively.

3. The manufacturing method according to claim 1, wherein the first layer has substantially the size of a first face of the substrate.

4. The manufacturing method according to claim 1, wherein the first layer has a size strictly smaller than the size of a first face of the substrate, the first layer extending only over a first portion of the first surface of the substrate after the compression step.

5. The manufacturing method according to claim 4, wherein said first portion of the first face of the substrate comprises at least one edge of the substrate, the at least one first positioning element being arranged near said edge of the substrate.

6. The manufacturing method according to claim 1, wherein the first layer is pressed against a first face of the substrate during the compressing step, the method comprising the step of providing a second layer comprising a layer of woven fabric or non-woven fabric, the second layer being provided with at least one additional reinforcing and/or decorative element, the second layer having at least one third positioning element, the at least one third positioning element being arranged outside the at least one additional reinforcing and/or decorative element, the second layer being aligned with the first layer and the substrate during the alignment step by aligning the at least one third positioning element with the at least one first positioning element and the at least one second positioning element, the second layer being pressed against a second face of the substrate during the compression step, the second face being opposite the first face.

7. The manufacturing method according to claim 1, wherein the at least one reinforcing and/or decorative element of the first layer is a woven or non-woven uni- or multi-directional reinforcing layer.

8. The manufacturing method according to claim 1, wherein the at least one reinforcing and/or decorative element of the first layer comprises a matrix and natural fibers, the matrix comprising between 10% and 60% polyurethane or epoxy resin.

9. The manufacturing method according to claim 1, wherein the base layer of the first layer comprises at least 20% polypropylene, at least 20% polyamide, at least 20% polyester, or at least 20% polylactic acid or is provided with a gripping layer.

10. The manufacturing method according to claim 1, wherein the thermoplastic fibers comprises polypropylene or polylactic acid.

11. A trim element produced by the manufacturing method according to claim 1.

12. A method of manufacturing a vehicle trim element, comprising the following steps:

supplying a substrate comprising natural fibers and thermoplastic fibers that are entangled together, the substrate having at least one first positioning element, supplying a first layer comprising a base layer made of woven fabric or non-woven fabric, the first layer having at least one reinforcing and/or decorative element and having at least one second positioning element that is arranged outside the at least one reinforcing and/or decorative element, wherein the second positioning element is arranged on the first layer such that, when the first layer and the substrate are overlaid with respective edges thereof aligned, the first positioning element and the second positioning element are aligned, aligning the first layer and the substrate by aligning the at least one first positioning element with the at least one second positioning element, and thereafter attaching the first layer to the substrate by compressing the first layer against the substrate.

* * * * *